Patented Apr. 28, 1953

2,636,882

UNITED STATES PATENT OFFICE 2,636,882

PREPARATION OF 3-PYRIDOLS FROM 2-ACYLFURANS

Andrew P. Dunlop, Riverside, and Samuel Swadesh, Maywood, Ill., assignors to The Quaker Oats Company, Chicago, Ill., a corporation of New Jersey No Drawing. Application August 11, 1950, Serial No. 178,998

6 Claims. (Cl. 260—297)

This invention relates to the preparation of pyridol compounds and more particularly to the preparation of 3-pyridols from 2-acylfurans.

We have found it possible to obtain good ultimate yields of 3-pyridols by reacting a 2-acylfuran with ammonia at elevated temperatures.

One object of the present invention is to provide an efficient process for the preparation of 3-pyridols. Another object is to provide a process for the preparation of 3-pyridols in a direct manner which can be easily carried out using relatively inexpensive equipment. A very important object is to provide an improved process for producing 3-pyridols by reacting a 2-acylfuran with ammonia. Other objects and advantages of the present invention will become apparent to those skilled in the art as the invention is more fully described.

Broadly stated, the present invention provides an improved process for the production of 3-pyridols which comprises heating a 2-acylfuran with ammonia in the presence of a solvent which is a good ionic medium, preferably water or an alcohol or a mixture of the two at elevated temperatures. In view of the fact that the particular 2-acylfuran used may be selected from a large list and since the best operating temperature depends largely upon the specific 2-acylfuran used, the temperatures employed may vary from about 100° to 200° C. Generally, we prefer to operate within a temperature range of 120° to 180° C. It is to be understood, however, that higher or lower temperatures may be used with a resultant increase or decrease in the reaction rate in accordance with the general law of chemical reactions. If the reaction is carried out in the absence of an added solvent the product is predominantly a 2-acylpyrrole as is described in our copending application entitled "Preparation of 2-acylpyrroles from 2-acylfurans," Serial No. 169,773, filed June 22, 1950. Actually the reaction can proceed in two directions, one the formation of the 2-acylpyrrole and two the formation of the 3-pyridol. The formation of the later, however is favored by the presence of a solvent and as is evident from an inspection of the table below the better the solvent is as an ionic medium the higher the yield of 3-pyridol.

*Reaction of 2-acetylfuran with ammonia*

| Solvent | Percent yield | |
|---|---|---|
| | Pyrrole | Pyridol |
| None | 9 | 0 |
| Alcohol | 38 | 10 |
| Alcohol-water | 2 | 47 |
| Water | 0 | 47 |

The proportion of the reactants namely, the 2-acylfuran and ammonia used in our process may be varied over a wide range. Theoretically, in our process one mole of the 2-acylfuran reacts with one mole of ammonia in accordance with the following equation:

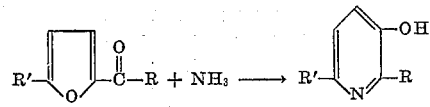

wherein

R=alkyl, aryl or furfuryl
R'=alkyl, aryl, furfuryl or hydrogen

In practice, however, we prefer to employ an excess of ammonia over the 2-acylfuran.

The products of our invention have been characterized as 3-pyridols by means of C, H, and N analysis, determination of neutral equivalents, by formation of the picrate derivatives and by the fact that these compounds produce a red color with $FeCl_3$ which is characteristic of phenolic compounds.

In order to disclose the nature of the present invention still more clearly, the following illustrative examples will be given in which "parts by weight" bear the same relation to "parts by volume" as do grams to cubic centimeters.

EXAMPLE 1

*Preparation of 2-methyl-3-pyridol*

To 25.3 parts by weight of 2-acetylfuran were added 293 and 300 parts by volume of 28% ammonium hydroxide and methanol respectively. After heating the solution for about 17 hours at a temperature of 140° to 160° C. in an autoclave, it was treated with 90 parts by weight of activated carbon in 3 equal increments and then concentrated at reduced pressure on a steam bath until crystal formation was observed. The mixture was cooled and then filtered. Further evaporation of the filtrate caused the precipitation of additional product. After combining this product with the first precipitate a total of 11.8 parts by weight of 2-methyl-3-pyridol was obtained representing a yield of 47 per cent of theory. The product had a melting point of 168.6° to 168.8° C. and the picrate derivative after recrystallizing from alcohol had a melting point of 201.6° to 201.8° C.

| Analysis | C | H | N | Neutral Equivalent |
|---|---|---|---|---|
| $C_6H_7ON$: | | | | |
| Theory | 66.05 | 6.43 | 12.84 | 109. |
| Found | 65.94 | 6.23 | 12.81 | 106 as acid. 110 as base. |

EXAMPLE 2

Preparation of 2-methyl-3-pyridol

To 25.3 parts by weight of 2-acetylfuran were added 293 and 300 parts by volume of 28% ammonium hydroxide and water respectively. After heating the solution for about 17 hours at a temperature of 140° to 160° C. in an autoclave, it was treated with 30 parts by weight of activated carbon and then concentrated at reduced pressure on a steam bath until crystal formation was observed. The mixture was cooled and then filtered. Further evaporation of the filtrate caused the precipitation of additional product which after combining with the first precipitate gave a total of 11.9 parts by weight of 2-methyl-3-pyridol representing a 47 per cent yield of theory. No pyrrole formation was observed.

EXAMPLE 3

Preparation of 2-ethyl-3-pyridol

To 30 parts by weight of 2-propionylfuran were added 400 parts by volume each of 28% ammonium hydroxide and methanol. After heating the solution for about 20 hours at a temperature of 130° to 140° C. in an autoclave, it was distilled under slightly reduced pressure until 600 parts by volume of methanol and water were removed. Benzene was then added to the solution and the distillation continued until all the water was removed. The residual solution containing the 3-pyridol in benzene was treated with 20 parts by weight of activated carbon and then cooled. 5.8 parts by weight of 2-ethyl-3-pyridol M. P. 134.6° to 135.2° C. was obtained as a precipitate which represented a 20 per cent yield of theory. The picrate derivative after recrystallizing from alcohol had a melting point of 171.7° to 172.3° C.

| Analysis | C | H | N | Neutral Equivalent |
|---|---|---|---|---|
| $C_7H_9ON$: | | | | |
| Theory | 68.27 | 7.37 | 11.38 | 123. |
| Found | 68.68 | 7.85 | 11.10 | {119 as acid. 123 as base. |

EXAMPLE 4

Preparation of 2-phenyl-3-pyridol

To 25 parts by weight of 2-benzoylfuran were added 196 and 300 parts by volume of 28% ammonium hydroxide and methanol respectively. After heating the mixture for about 21 hours at a temperature of 150° to 160° C. in an autoclave, it was treated with 60 parts by weight of activated carbon in two equal increments and then concentrated at reduced pressure on a steam bath until crystal formation was observed, at the same time a small amount of dark oily liquid separated. The concentrated solution was cooled, a small amount of alcohol added to redissolve the oily liquid and then filtered. 16.1 parts by weight of 2-phenyl-3-pyridol M. P. 202.4° to 203° C. was obtained which represented a 65 per cent yield of theory. The picrate derivative after recrystallizing from alcohol had a melting point of 201.0° to 201.4° C.

| Analysis | C | H | N | Neutral Equivalent |
|---|---|---|---|---|
| $C_{11}H_9ON$: | | | | |
| Theory | 77.19 | 5.26 | 8.19 | 171. |
| Found | 77.48 | 5.51 | 8.12 | {205 as acid. 166 as base. |

EXAMPLE 5

Preparation of 2,6-dimethyl-3-pyridol

To 30 parts by weight of 2-acetyl-5-methylfuran were added 360 and 500 parts by volume of 28% ammonium hydroxide and ethanol respectively. After heating the mixture for about 20 hours at a temperature of 130° to 135° C. in an autoclave, it was treated with 30 parts by weight of activated carbon in 3 equal increments and then concentrated at reduced pressure on a steam bath until the mixture separated into three phases consisting of crystalline, dark oily-liquid, and aqueous phases.

The crystalline phase was removed by filtration, the aqueous layer of the filtrate was separated and concentrated which caused the formation of additional crystalline material. From the two batches of crystals 2.7 parts by weight of 2,6-dimethyl-3-pyridol M. P. 209.4° to 210.2° C. was obtained which represented a 9 per cent yield of theory. The picrate derivative after recrystallizing from alcohol had a melting point of 204.5° to 204.9° C.

| Analysis | C | H | N | Neutral Equivalent |
|---|---|---|---|---|
| $C_7H_9ON$: | | | | |
| Theory | 68.27 | 7.37 | 11.38 | 123. |
| Found | 67.90 | 7.55 | 11.20 | 122 as base. |

Although the present invention has been described in conjunction with preferred embodiments, it is to be understood that modifications and variations may be resorted to without departing from the spirit and scope of the invention, as those skilled in the art will readily understand. As for example, in addition to the acylfurans enumerated in the specific examples, higher members of the homologous series such as butyryl, valeryl, caproyl furans, etc., may be treated with ammonia in a similar manner to produce the corresponding 3-pyridols. As another example, the use of activated carbon is not the only method for purification, but other purification methods can be used as will be apparent to those skilled in the art. Since the only purpose of the activated carbon was as a purification agent and thus facilitating the recovery of the final product, its use may be dispensed with if desired. Such variations and modifications are considered to be within the purview and scope of the appended claims.

We claim:

1. A process for the production of a 3-pyridol which consists in reacting a 2-acylfuran of the general formula:

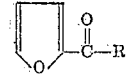

wherein R is an alkyl radical containing not more than two carbon atoms with ammonia at a temperature of 100°–200° C. in the presence of a solvent selected from the class consisting of water, alcohol and solutions of the two.

2. A process for the production of a 3-pyridol which consists in reacting a 2-acylfuran of the general formula:

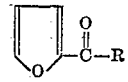

wherein R is an alkyl radical containing not more than two carbon atoms with ammonia at a temperature of 120°–180° C. in the presence of a solvent selected from the class consisting of water, alcohol and solutions of the two.

3. A process for the production of a 3-pyridol which consists in reacting a 2-acylfuran of the general formula:

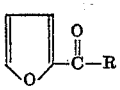

wherein R is an alkyl radical containing not more than two carbon atoms with ammonia at a temperature of 100°–200° C. in the presence of water as a solvent.

4. A process for the production of a 3-pyridol which consists in reacting a 2-acylfuran of the general formula:

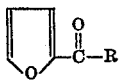

wherein R is an alkyl radical containing not more than two carbon atoms with ammonia at a temperature of 100°–200° C. in the presence of alcohol as a solvent.

5. A process for the preparation of 2-methyl-3-pyridol which consists in reacting 2-acetylfuran with ammonia at a temperature of 100° to 200° C. in the presence of water as a solvent.

6. A process for the preparation of 2-ethyl-3-pyridol which consists in reacting 2-propionylfuran with ammonia at a temperature of 100° to 200° C. in the presence of water as a solvent.

ANDREW P. DUNLOP.
SAMUEL SWADESH.

References Cited in the file of this patent

UNITED STATES PATENTS

| Number | Name | Date |
|---|---|---|
| 2,171,159 | McNally | Aug. 29, 1939 |

OTHER REFERENCES

Kiyose Chemical Abstracts, vol. 34 (1940), page 3273.